Nov. 7, 1967     F. R. KLEIMAN     3,351,078
CAR TOP CAMPER

Filed June 1, 1965     2 Sheets-Sheet 1

INVENTOR.
FLOYD R. KLEIMAN
BY
Corey & Corey
Atty's

INVENTOR.
FLOYD R. KLEIMAN
BY Corey & Corey
Atty's

United States Patent Office 3,351,078
Patented Nov. 7, 1967

3,351,078
CAR TOP CAMPER
Floyd R. Kleiman, Lincoln, Nebr.
(5398 Peacock Lane, Riverside, Calif. 92505)
Filed June 1, 1965, Ser. No. 465,244
8 Claims. (Cl. 135—1)

This invention concerns a car top sleeping compartment and more particularly a device which is normally carried in a folded or collapsed condition but having a roof section which may be elevated manually by the rotation of a crank to afford space for sleeping.

Various car top camping compartments have been proposed. Generally they comprise a foldable rib structure on which canvas is stretched and carried on some form of platform or box. A structure such as these is easily raised by reason of their light construction, but they tend to billow and become damaged by the winds created when an automobile is traveling at highway speeds. It has been proposed that such structures be covered by solid sheet metal enclosures to prevent such damage, but these enclosures in themselves become difficult to handle, particularly when the entire unit is mounted on the top of a vehicle.

It is therefore a primary object of my invention to provide a car top device in which two box-like structures of substantially rigid material such as metal or fiberglass may be used to form the floor and roof, with a lever mechanism interposed between to permit the elevation of the roof to provide a considerable sleeping area.

It is a further object of my invention to provide a device in which the floor and roof are joined together by canvas walls which are drawn inwardly as the roof is lowered towards the floor of the device.

It is yet another object of my invention to provide a device in which a pair of scissors-like levers may be positioned on opposite walls of the structure and operated by the manual rotation of a crank.

Another object of my invention is to provide a device in which the rotation of the aforesaid crank will also cause the canvas wall sections to be drawn inwardly when the roof section is lowered.

It is yet another object of my invention to provide a device in which the roof section may be firmly locked in relation to the floor section when the two are collapsed together.

It is yet another object of my invention to provide a device in which the roof section, when collapsed, overlaps the floor section and one in which the canvas side walls are held inwardly from the point where such overlapping occurs.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims, without departing from the spirit of the invention.

Figure 3:
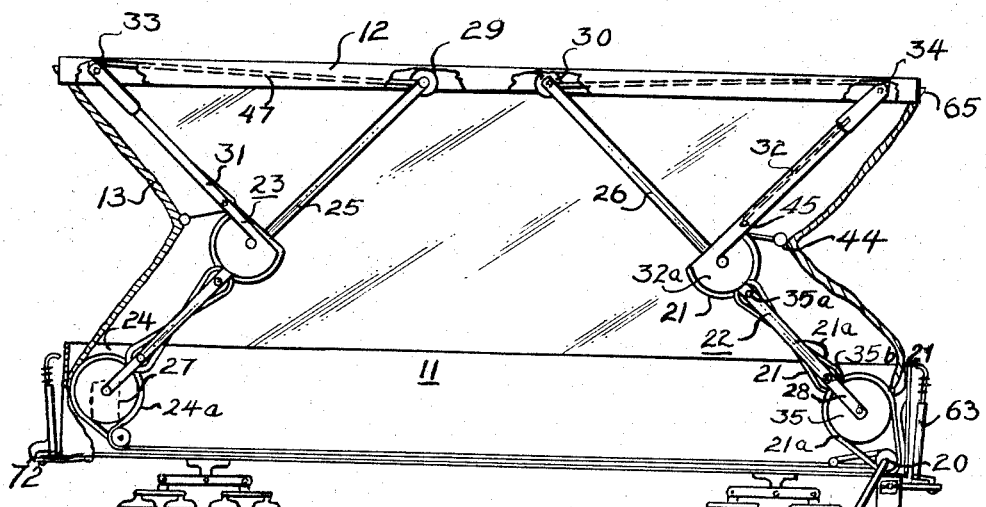
FIGURE 3 is a side view of a partially raised car top camper with portions of the top, bottom, and canvas walls cut away to show the operative mechanism within.
Figure 6:
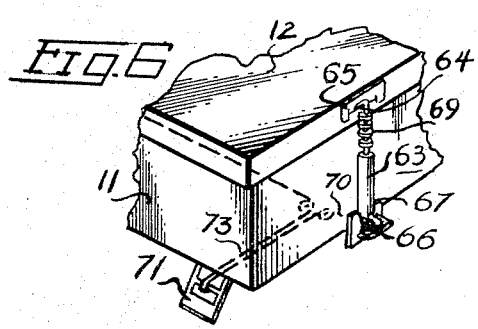
FIGURE 6 is a perspective view of a portion of the device and showing the details of a latch member.
Figure 7:
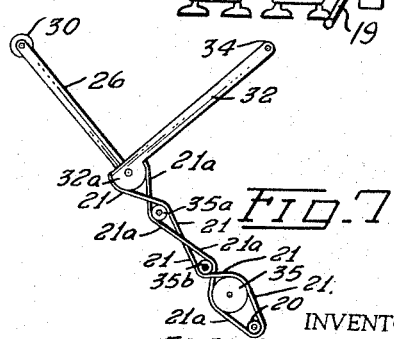
FIGURE 7 is a schematic diagram showing the cable and pulley arrangement for elevating and lowering the top section.
Figure 4:
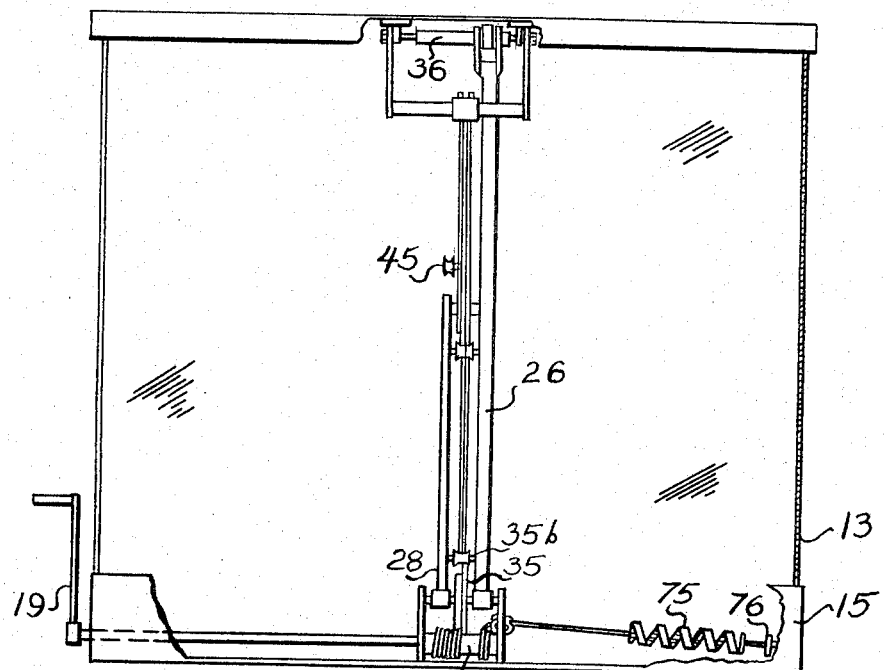
FIGURE 4 is an end view of the device showing the lever mechanism in a fully extended position with the roof portion at its highest possible elevation.

Referring now to the drawings, and more particularly to FIGURE 3; the device consists of two main portions, the box-like base section 11, and a somewhat shallower box-like roof section 12. The roof section 12 is slightly larger in both length and width so that it will nest over the lip of the lower box-like section 11. Between these two sections and around all four sides of the structure is a continuous canvas wall 13. This canvas wall is mounted on the inner side of the upper and lower box section, as best shown in FIGURE 4. It will be understood of course that the joint between the upwardly extending flange 15 of the box and the canvas 13 must be watertight. This canvas is provided with a suitable opening such as 17 to permit access to the inside of the compartment and also may be provided with additional openings such as 16 for windows and ventilation.

Figure 1:
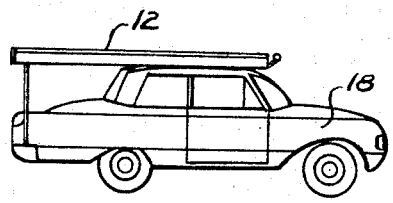
FIGURE 1 is a small view of an automobile having a car top camper of my invention mounted thereon in a collapsed position.
Figure 2:
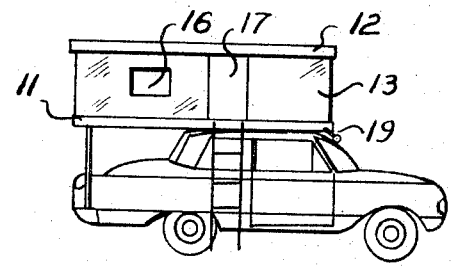
FIGURE 2 is another view of an automobile having the car top camper mounted thereon in a raised position.

The base section 11 is mounted on the top of a motor vehicle such as 18 of FIGURE 1, and when the automobile is being driven on the highway, the camper is in a lowered position, the top cover overlapping the lower base portion to make a watertight closure. As previously stated, the base and cover are made of a substantially rigid material such as a metal, wood, or fiberglass.

When it is desired to use the compartment for sleeping, the roof section 12 is raised in relation to the base 11 by the rotation of a crank member 19, as shown in FIGURE 3. Through means of a drum or pulley 20 and cables 21 and 21a, a scissors-like leverage assemblies, indicated generally at 22 and 23, are actuated by the cables 21 and 21a for the leverage assembly 22, and the second cables 24 and 24a for the leverage assembly 23. The two scissors-like lever assemblies are identical in structure but reversed in position. They each include a long arm such as 25 of lever assembly 23 and 26 of lever assembly 22, which arms are pivotally mounted on the base member at 27 for the arm 25 and at 28 for the arm 26.

These two arms are adapted to move in a 90 degree arc from the horizontal plane coextensive with the horizontal plane of the base member 11 to a vertical plane, and when in the vertical plane, delineates the full extent of the elevation of the roof section 12. In length they are customarily four to five feet long. The upper ends of the lever arms 25 and 26 are provided with rollers 29 and 30.

At the midpoint of lever arms 25 and 26 are pivotally mounted a second shorter arm such as 31 and 32. These two arms 31 and 32 are also pivotally affixed at 33 and 34 to the outer ends of the roof or cover section 12. The short lever arms each include as a part thereof a half sheave or pulley or eccentric guide 32a having the axes thereof coaxial with the pivotal connection of the short and long lever arms. Pulley sheaves 35 are rotatably mounted coaxially with the pivotal connection of the long lever 26 and base 11.

The cables, pairs 21 and 21a and pairs 24 and 24a, are both threaded in a similar manner, and for purposes of clarity I shall describe the threading of the cables 21 and 21a, it being understood that the second cables 24 and 24a are threaded in the same manner. Cable 21 is wrapped around the drum 20. In FIGURE 3 the wrap is in a clockwise direction. It then extends upwardly and over the rotatably mounted pulley 35, thence under the rotatably mounted pulley 35b, thence along the lower portion of the arm 26 to the midpoint where it is threaded over the top of the pivotally mounted pulley 35a, the pivot shaft of which is fixedly attached to the arm 26, thence around the lower portion of the eccentric guide or half sheave 32a, then it extends outwardly and upwardly coextensive with the arm 32 to the outer portion of this arm where it is connected to the arm.

It will be apparent that as the drum or pulley 20 is rotated, this cable will be wrapped on the drum and will, by means of its wrap about pulleys 35 and half sheave 32a, exert a lever force to draw the upper portion of the arm 26 outwardly to the horizontal. The cable 21 will also exert a similar leverage on the arm 32 by means of its wrap about the eccentric guide 32a, and since the arm 32 is pivotally fixed to the top 12, causes the arm to move to a vertical position.

Since the cable 21 is attached to the arm 32, pull in the cable 21 set up by wrapping the cable on the winch 20 will cause the half sheave 32a to act as a lever arm to draw it to the vertical or raised position. Even though the cable 21 moves with relation to arm 26 as it unwraps from half sheave 32a, its movement is restrained and consequently the pulley 35 also acts as a lever to rotate and raise the arm 26. The action is reversed when the rotation of winch 20 is reversed and the cable 21a pulls the levers to the collapsed condition.

Pull on the cable 21 causes a scissors-like closing action of arms 26 and 32, and since arm 32 is pivotally engaged to the roof at 34, arms 26 and 32 will be drawn toward each other into substantially one vertical support. The cable 24 is also wrapped in a clockwise direction on the drum 20 and threaded in the same manner as cable 21 and will therefore have the same effect on the arms 25 and 31, with the result that the two arms 25 and 26 will simultaneously be drawn outward and will cause the roof section to extend upwardly to its maximum limit.

Suppose pulley or half sheave 32a is approximately 12 inches in diameter and drum 20 one inch in diameter. In raising the cover, the pulley will make one-half a revolution or approximately 18 inches travel of cable 21 and drum 20 will rotate say 6 times, a mechanical advantage of 12 times. Also at the upper portion of travel the rise of the cover will be slower than the rate of rotation of the pulley 32a. Note that the cable 21 is trained over pulley 35, under pulley or sheave 35b mounted for rotation on arm 22, over pivotally mounted pulley 35a, between 35a and pulley 32a, under pulley or half sheave 32a and up to the end of arm 32 where it is secured to the arm.

Cable 21a is trained over the same pulleys in the opposite sense. Corresponding cables are trained over the assembly 23. The lifting system is thus applied to both ends of the cover at once. Greater mechanical advantage is attained by angularity of the scissor arms at the upper portion of the cover travel, resulting in greater force application at the upper part of the cover travel where it is needed.

The second cable 21a is also wound on the drum 20 but in a direction opposite to that of 21. Cable 21a may be a continuation of cable 21, the drum 20 merely acting as a pulley, taking in one part of the cable and paying out the other. The cable 21a is threaded under the pulley 35, then over the pulley 35b, then under the pulley 35a, then upwardly on the inside of the half sheave 32a, then to the upper end of the arm 32 where it is fixedly attached. It will be apparent that as the cable 21a is drawn onto the drum 20, it will exert a force on the arms 26 and 32 opposite to that of cable 21, which will cause the arms 26 and 32 to move into a horizontal plane causing the roof section to drop down to the base member.

It is apparent that the canvas side walls 13 must fold as the roof section 12 is lowered onto the base portion 11. It is of course desirable that these folds of canvas all be contained in the enclosed structure, and to accomplish this end I have provided a drawstring structure to achieve that result. The nature of this structure is more fully shown in FIGURES 3 and 5.

Figure 5:
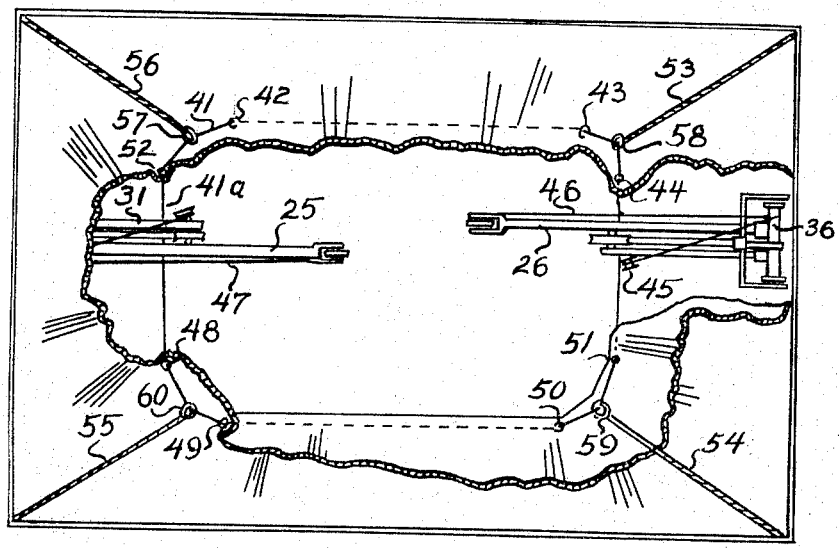
FIGURE 5 is a top view of the device in section just below the roof portion to show the drawstring mechanism which causes the vertical canvas walls to be drawn inwardly when the device is in a closed position.

Referring to FIGURE 5, the drawstring 41 is affixed to the inner side of the canvas at the center point thereof in a horizontal plane. Obviously as this rope is shortened in total length, the canvas walls will be pulled together and the canvas portion will be held inside of the two box structures as they are brought together. To shorten this rope, I have connected two portions of it to lever arms 25 and 26 in the manner which I will now describe.

The rope is threaded through a series of eyelets, such as 42, 43 and 44, so that it will slide through these eyelets. It is then threaded inwardly over a small pulley 45 of the lever arm 32, thence upwardly along the length of arm 32 to the pulley 36, as shown in FIGURE 5, thence inwardly along the horizontal plane of the roof to the upper end of the arm 26, this rope being indicated generally at 46. A second rope 47 is similarly threaded in relation to arms 25 and 31 and connected to the rope 41a which in turn is threaded through eyelets 48, 49, 50 and 51. The rope 41 is anchored to the canvas at one end, indicated at 52, while the rope 41a is anchored to the canvas at the eyelets 51. It will be apparent that as the lever arms 26 and 32 move away from each other, the rope will be drawn through the eyelets 57, 58, 59 and 60, which in turn are affixed to the elastic cords 53, 54, 55 and 56, and the canvas pulled inwardly.

The lever arms 25 and 31 will cause the same results in relation to the rope 41a and the second portion of the canvas will also be drawn inwardly. It will be apparent that this action will be simultaneous with the lowering of the roof section. To cause the canvas to be drawn outwardly when the roof section is raised, I have provided four elastic cords 53, 54, 55 and 56 disposed at the four corners of the structure. These are fastened at one end to the box member 11 and at the other end to the roof member 12. They each individually have an eyelet attached to them at 57, 58, 59 and 60 through which the draw rope is threaded.

To lock the top cover portion 12 in relation to the base 11 when in the collapsed relationship, I have provided a latch member such as 63, one of which is mounted on each end of the structure. This latch member consists of a hook 64 which engages a pocket 65 on the top cover. The hook is slidably mounted in a tubular housing 67 which is pivotally mounted on the base member 11 at 66. A spring member 69 holds the hook in a normally outwardly sloped upward or open position. The hook is attached to a cable 70 which extends through the tubular housing and beneath the box 11 and outwardly to the edge where it is attached to a lever 71 which is pivotally mounted in such a manner that it will shorten the cable 70 to engage the hook 64 in the pocket 65. A second latch member 72 is also provided for the opposite end of the cover and is actuated by cable 73.

Referring again to FIGURE 4, it will be seen that I have provided a counterbalance spring 75 to aid in raising the roof section. This spring is anchored to the base 11 at 76 and the opposite end is attached to a cable 77 which is in turn wrapped on the drum 20.

In operation, car top campers ordinarily are carried in a closed position. To open the camper, the user would first move the latch 71 to cause the hook members 63 and 72 to unlatch. The user would then turn the crank 19 in a clockwise direction. This would cause the cables to wrap on the drum 20 and, by reason of the fact that they are wrapped over the various pulleys in a zig-zag fashion, leverage would be applied to the arms to the extent of the radius of the pulley such as 35 and the eccentric 32a, causing the arms to straighten out into a vertical position and to raise the cover to its highest elevation.

To lower the device, the crank 19 would be turned in the opposite direction and the cables, which are threaded on the opposite sides of the pulleys 35 and 32a, would then act through similar leverage to move the arms inwardly and downwardly, simultaneously pulling the canvas side in towards the center of the camper so that when the cover portion 12 moves into place over the base section, the canvas walls will be contained entirely within the box, thus formed.

Although I have described a specific embodiment of my invention, it is apparent that modifications thereof may be made by those skilled in the art. Such modifications may be made without departing from the spirit and scope of my invention as set forth in the appended claims.

I claim as my invention:

1. In a car top sleeper, a roof section, a base section, a pair of lever members pivotally mounted at opposite ends of said base section and adapted to move in a 90 degree arc from the horizontal to the vertical, a canvas wall member mounted on the base and roof section and adapted to extend therebetween, and a cable member fixedly attached to the upper end of each said lever members and threaded outwardly in the same plane as the roof section to the edge thereof, then extending downwardly towards the midsection of said lever member, thence outwardly through a plurality of eyelets in said canvas wall member all around the wall to a point of fixed attachment to the canvas wall member so as to pull in all four sides, whereby the movement of said lever members downwardly through the aforesaid 90 degree arc will cause the cables to be pulled inwardly parallel to the roof section, thereby causing the canvas wall member connected to the other end of said cables to be pulled inwardly on all four sides with the levers to the interior area of said car top sleeper.

2. In a car top camper having a rigid base section and a rigid top section, an elevating structure adapted to raise the top section relative to the base section, said elevating structure comprising a pair of first lever members one end of each of which is pivotally connected to the base section at opposite sides thereof, the upper ends of said first lever members being adapted to roll on the underside of the top section, second lever members each having one end pivotally connected between the ends of a first lever member and pivotally mounted at the other end to the outside edge of said top section, a pulley mounted on the base section at the pivoted end of each of said first lever members, an eccentric guide member at the junction of each pair of first and second lever members, a cable drum secured to said base section and provided with means to turn said drum, and a cable wrapped around said drum and extending partially around each of said pulley members, thence along each of the first lever members and around one side of the eccentric guide member, thence along the second lever member to its upper end where the cable is fixedly attached, whereby rotation of the drum in one direction will exert tension in said cable to cause the upper ends of each pair of first and second lever members to move towards each other and thereby raise said top section relative to said base section.

3. The elevating structure of claim 2 in which there is provided a second cable wrapped around said drum oppositely to the wrap of the first cable, thence around the other side of each of said pulley members, thence along each of the first lever members and around the other side of the eccentric guide member, thence along the second lever member to its upper end where the second cable is fixedly attached, whereby rotation of the drum in the other direction will exert tension in said second cable to move said top section toward said base section.

4. The elevating structure of claim 2 in which a torsional spring is operatively connected to the cable drum in such a manner that said spring will be tensioned when said top section and base section are adjacent one another, said spring thereby assisting to raise said top section by helping to rotate said drum.

5. The elevating structure of claim 3 in which said eccentric guide member is substantially semicircular in form and in substantially the same plane with said lever members, and said first cable passes around the inwardly facing side of said guide member, the second cable passing around the outwardly facing side thereof.

6. A car top camper comprising a base section and a rigid roof section, a pair of first lever members one end of each of which is pivotally connected to the base section at opposite sides thereof, the upper end of each of said first lever members being adapted to roll on the underside of the roof section, second lever members each having one end pivotally connected between the ends of a first lever member and pivotally mounted at the other end to the outside edge of said roof section, means for moving the upper ends of said first and second lever members toward each other until they substantially coincide and are in a substantially vertical position with the roof section elevated above and parallel to the base section, and a flexible weather-impervious wall secured to the base section and roof section around their edges, said flexible wall being positioned outside of said lever members and held in a taut condition when said lever members are in a vertical position with the roof section elevated above the base section.

7. The car top camper of claim 6 in which eyelets are provided around the wall between the roof and base sections, and a cord member having one end attached to said wall extending through said eyelets and attached to said lever members thereby causing said wall to be pulled inwardly as said roof section moves toward said base section.

8. The car top camper of claim 7 in which a plurality of elastic cords are affixed to said wall substantially transversely to said cord member and connected to said cord member to pull it outwardly as said roof section is elevated.

References Cited
UNITED STATES PATENTS

| | | | |
|---|---|---|---|
| 2,291,900 | 8/1942 | Jimmes | 135—1 |
| 2,683,265 | 7/1954 | Wayne | 135—1 X |
| 2,798,760 | 7/1957 | Hille | 296—23 |

REINALDO P. MACHADO, *Primary Examiner.*

A. I. BREIER, *Assistant Examiner.*